United States Patent Office 3,359,191
Patented Dec. 19, 1967

3,359,191
METHOD FOR THE MANUFACTURE OF SOLID TYPE ELECTROLYTIC CONDENSERS OF TITANIUM
Shinichi Minami, Osaka, Wataru Mizushima Neyagawa-shi, and Akiyoshi Nomura, Kadoma-shi, Japan, assignors to Matsushita Electric Industrial Co., Ltd., Osaka, Japan, a corporation of Japan
No Drawing. Filed Feb. 20, 1964, Ser. No. 346,089
Claims priority, application Japan, Feb. 23, 1963, 38/9,118
9 Claims. (Cl. 204—38)

The present invention relates to a method for the manufacture of a solid type electrolytic condenser of titanium.

The primary object of the invention is to provide new and improved means for manufacturing a solid type electrolytic condenser having excellent electrostatic characteristics and a minimum of leakage current by the use of anodic oxidation films of titanium which are generally defective in their low withstand voltage and great leakage current.

Other objects and advantages of the invention will become apparent as the description further proceeds.

In conventional processes of manufacturing a solid type electrolytic condenser by the use of a metal such as tantalum, aluminum, niobium or titanium on which an oxide film of dielectric property having a valve action is formed by an anodic oxidation treatment, it is well known that a process is generally necessary by which layers of an oxide having a semiconductive property such as manganese dioxide, cobalt oxide or lead oxide are formed on said oxide film. A method most frequently employed heretofore comprises wetting the oxide film with an aqueous solution of manganese nitrate, and heating the oxide film at a temperature of several hundred degrees to cause the decomposition of manganese nitrate to thereby deposit manganese dioxide on the oxide film. Since this method is generally widely used in the manufacturing process of solid type electrolytic condensers of tantalum, aluminum and niobium, the inventors also employed the above method in the manufacturing process of the solid type electrolytic condenser of titanium.

When titanium is subjected to anodic electrolysis by the use of a suitable electrolyte, an oxide film forms which has a bright color analogous to that of tantalum. For example, an oxide film having an interference color of bright green is obtained when D.C. voltage of 80 volts is impressed between a plate of titanium and an inert opposite electrode of carbon or a plate of platinum soaked in an electrolyte in the form of a solution of phosphoric acid or ammonium borate. The titanium anode so treated is then wetted by an aqueous solution containing about 60% of manganese nitrate and subjected to pyrolysis in a furnace at a temperature of 300° C. All of solid type electrolytic condensers manufactured by the above process invariably show short circuit by the impression of D.C. voltage of 5 volts. In other words, the anodic oxidation film of titanium obtained by such method does not possess an excellent insulating property which is adapted for utilization as a dielectric element for a solid type electrolytic condenser. The inventors have made various studies in an effort to improve the insulating property of anodic film of titanium and found out that the following two methods of anodic oxidation are quite effective for the improvement in the insulating property thereof. Any of these methods is related with the selection of an electrolyte used for the anodic oxidation of titanium.

The first method comprises the use of a non-aqueous solution which contains an electrolyte dissolved in an organic solvent such as ethylene glycol, glycerine, formamide or alcohol. For example, a plate of titanium may be soaked in an electrolyte which contains 10 grams of ammonium borate dissolved in 100 milliliters of ethylene glycol and subjected to anodic oxidation under the impression of D.C. voltage of 60 volts to obtain an oxide film. The product of electrostatic capacity and formation voltage of the oxide film so obtained has a value of 10 microcoulombs per square centimeter and the film has an amorphous structure when determined by the method of electron diffraction. The anode oxidized by such treatment is wetted by a manganese nitrate solution and subjected to pyrolysis in a furnace at a temperature of 300° C. A solid type electrolytic condenser so obtained has a value of leakage current of less than 1.0 microampere per square centimeter under the impression of D.C. voltage of 6 volts and thus provides a withstand voltage property satisfactory for use under a low voltage.

The second method comprises the use of a molten salt which is prepared by heating a nitrate such as sodium nitrate, potassium nitrate or calcium nitrate up to a temperature above its melting point. For example, sodium nitrate may be fused by being heated at a temperature of 300° C. to provide an electrolyte and a plate of titanium is soaked therein under the impression of D.C. voltage of 60 volts for the purpose of anodic oxidation thereof. An oxide film so obtained has a product of electrostatic capacity and formation voltage of 35 microcoulombs per square centimeter, and the film, when determined by the method of electron diffraction, is found to include titanium dioxide of rutile type structure. The anode oxidized by such treatment may be wetted by a manganese nitrate solution and subjected to pyrolysis in a furnace at a temperature of 300° C. A solid type electrolytic condenser obtained by this process has a value of leakage current of less than 0.5 microampere per square centimeter under the impression of D.C. voltage of 6 volts and is found that the oxide film thereof has a far more improved insulating property.

In spite of such improvement in the methods of anodic oxidation of titanium as described above, many difficult problems are yet left to be solved with respect to the manufacture of solid type electrolytic condensers of titanium. Or more precisely:

(1) Solid type electrolytic condensers of titanium show a greater leakage current than those of other metals such as tantalum, aluminium and niobium, and are less reliable in actual applications since they show a poor performance when subjected to a high temperature life test or humidity withstanding test.

(2) A sintered anode is generally perferred in order to obtain an electrolytic condenser of small size. In case of a sintered anode of titanium, however, a solid type electrolytic condenser of titanium manufactured by any of the above-mentioned methods of anodic oxidation shows a poor withstand voltage and is only operable under a working voltage of the order of 3 volts. This is assumed to be attributable to the complexity in the shape of the anode and a resultant difficulty of complete formation of oxide films inwardly into boundaries of fine granules inside the sintered body.

In the solid type electrolytic condensers of titanium, the important problem of poor insulating property must be solved. There are among others two methods for improving such poor insulating property inherent in the titanium condensers. One method may be derived from a study which aims at devising a novel method of forming an oxide film particularly applicable to titanium to obtain a perfect oxide film having an excellent insulating property. The other method may be derived from a study which is related with a suitable method of after-treatment by which an additional insulating property is provided on the oxide film having already a contain, though imperfect, degree of withstand voltage, obtained by the above-mentioned method of anodic oxidation.

The present invention relates to the latter method or method of providing an additional insulating property to the oxide film. Generally, in a manufacturing process of solid-type electrolytic condensers, methods of firmly depositing a semi-conductive material such as manganese dioxide on an oxide film comprise a method of wetting the anode by a solution of a material such as manganese nitrate which forms a semi-conductive oxide by a pyrolytic action and subjecting the anode to pyrolysis in a furnace, as well as a method of disposing the anode of a condenser in a solution of a material, such as a manganese sulfate solution, which may easily educe manganese dioxide for deposition on the electrode when subjected to electrolysis for obtaining manganese dioxide electrolytically deposited on the surface of the anode.

However, according to the latter method or the method of electrolytic deposition, the anode to be placed in the electrolytic bath is in a state that it is coated with an oxide film of high insulating property. Therefore, only current available during the electrolysis is a leakage current through the oxide film on the anode. This leakage current, however, does not necessarily flow out at a same current density at all points on the anode surface, and the current density is high at weak points in the oxide film, while extremely low at strong points. Thus, it is difficult to obtain a uniformly coated layer of manganese dioxide according to the method of electrolytic deposition.

The present invention effectively takes advantage of the fact that a semiconductive material is preferentially deposited on weak points of the oxide film in said method of electrolytic deposition of semiconductive material, and is characterized in that such semiconductive material as manganese dioxide is made to deposit solely on weak points of the oxide film obtained by the anodic oxidation and the anode is subsequently covered in a conventional manner with a layer of a semiconductor obtained by the pyrolysis of a semiconductor forming material such as a manganese nitrate solution. When the anode of titanium is subjected to anodic oxidation, some weak points lie in scattered relation on the oxide film and permit passage of a greater leakage current than in case of aluminum or tantalum. This electrode is placed in a solution such as of manganese sulfate or lead acetate which will readily educe a semiconductive material, and electrolysis is carried out with the electrode made to act as the anode and opposed to a suitable inactive electrode. Thus, it is possible, by suitably controlling the current density and duration of electrolysis, to cause manganese dioxide or lead dioxide to deposit solely on the scattered weak points without depositing all over the anode surface.

Since positive potential is impressed on the titanium electrode during this electrolytic process, the oxide film is reformed simultaneously with the deposition of the semiconductive material and the weak points are thereby mended by the supply of oxygen from the semiconductive oxide firmly deposited thereonto. This electrolytic process according to the invention will now be compared with a prior case wherein an oxide semiconductor is deposited solely by the pyrolytic process of a semiconductor forming material such as a manganese nitrate solution. With regard to the latter process, it is considered that weak points in the anodic film exist in most cases at cracked portions in the film or at boundaries of granules in case of a sintered anode, and the oxide semiconductor of firmly deposited nature can not form at such narrow portions, with the result that the semiconductor layer is deposited with gaps therein spaced apart from each other. In the solid type condenser finished under such a state, problems undesirable in respect of its characteristics will inevitably be brought forth. If, for example, colloidal carbon, being a commonly used cathodic material, directly deposits on the weak points in the oxide film, an increase in a leakage current will result, and even in the absence of such increase, an increased loss will be inevitable. In contrast thereto, in the case of the invention in which the oxide semiconductor such as manganese dioxide is selectively deposited on the weak points in the oxide film, a withstand voltage structure in the form of metal-oxide-semiconductor is completed by the reformation effect simultaneously taking place during the electrolysis. Therefore, it is possible to greatly eliminate any adverse effect that may be brought forth by the weak points in the titanium oxide film.

From the above discussion, it may be inferred that the method of electrolytic deposition is preferable to the method of pyrolysis of a semiconductor forming material in order to effectively deposit the semiconductive material on the oxide film. In a manufacturing process of a solid type electrolytic condenser, sufficient deposition of a semiconductive material is an indispensable requisite in respect of the characteristics of such electrolytic condenser, and deposition must be repeated three to five times even in a common method of pyrolysis of a semiconductor forming material. If the method of electrolytic deposition is solely relied on to obtain such great amount of semiconductor coating, a considerably great amount of electricity must be passed through the oxide film, and this process is rather unacceptable from a view point of maintenance of insulation of the oxide film. Further, it must be pointed out that the semiconductive material obtained by the electrolytic deposition tends to form in a great quantity at the weak points and in the vicinity thereof. When, therefore, the anode takes the form of a sinter-bonded body of titanium powder and weak points are located midway of pores forming passages between the exterior and interior of the sinter-bonded body, the passages leading to the interior may be blocked by the great amount of semi-conductive material formed at the positions of pores.

Therefore, it is most preferable that the weak points alone in the oxide film are filled with an oxide semiconductor according to the method of electrolytic deposition and subsequently the oxide film is covered by a great amount of semiconductor according to the method of pyrolysis of a semiconductor forming material. This method is applicable with better effect to an electrode such as a sinter-bonded anode for which the formation of a perfect oxide film is a matter of considerable difficulty due to the complicate shape of its surface rather than a foil type or rod type anode which has a substantially flat anode surface.

The invention will now be described with reference to a preferred embodiment thereof.

Powder of titanium having a purity of 99% up and a grain size of 200 to 300 mesh is moulded by a press into a disc of 2.5 mm. in diameter and 1 mm. in thickness. During this moulding operation, a portion of a titanium wire having a diameter of 0.5 mm. is embedded in the moulded body to provide an anode lead. This moulded body is subjected to sintering for 10 minutes at a temperature of the order of 1000° C. to 1200° C. in a vacuum furnace at a degree of vacuum of about $10^{-5}$ to $10^{-4}$ mm. Hg to obtain a sintered titanium anode of porous nature. The anode so prepared is soaked in an electrolytic cell containing an electrolyte of sodium nitrate heated and fused at a temperature of 300° C. and subjected to anodic oxidation under impression of a formation voltage of 60 volts for 30 minutes. The anode is taken out of the formation bath, dried after sufficient washing with water, and subjected to a treatment for electrolytic deposition of manganese dioxide. A preferred electrolytic bath for this treatment comprises an electrolyte of a composition including 1 mol of manganese sulfate and 0.5 mol of sulfuric acid dissolved into 1 l. of water and heated to a temperature of about 80° C. to 100° C.

The anode is placed as a positive electrode in the electrolytic bath of the above composition, and a D.C. voltage is impressed between the anode and an opposing negative electrode of an inactive material. This voltage may be optionally selected between 20 volts and 70 volts. The anode is taken out of the electrolytic bath after about 10 minutes' electrolysis, and it will be seen that black manganese dioxide is deposited in scattered relation solely on portions which seem to be weak points in the anode.

The electrode is further dried up after sufficient washing again with water and soaked in a manganese nitrate solution having a concentration of about 60%. The electrode is then pulled out of the manganese nitrate solution and subjected to pyrolysis for 5 minutes in a furnace at a temperature of the order of 300° C. The electrode is subsequently soaked in a 20% sodium nitrate solution and a voltage of 10 to 20 volts is impressed thereon for several hours for the purpose of effecting reformation thereof. As is generally known, characteristics of the finished article can be improved by repeating two to three times a series of processes including the impregnation of the manganese nitrate solution, pyrolysis and subsequent reformation. At the completion of all these processes, the electrode is sufficiently washed with water and dried up. The electrode is then soaked in a suspension of colloidal carbon and left to stand in a thermostatic drier at a temperature of about 85° C. for obtaining a carbon cathode. After the above process, a conductive coating material such as silver paint is applied and baked onto the condenser unit, and a cathode lead is fitted thereto.

In the following Table 1, characteristics of the solid type electrolytic condenser of titanium obtained after all of the above processes will be compared with characteristics of solid type electrolytic condenser of titanium obtained by the processes in which the electrolytic deposition process is eliminated from the above processes.

TABLE 1

| | With electrolytic deposition process | Without electrolytic deposition process |
|---|---|---|
| Leakage current with impression of 3 v. ($\mu$a.) | 0.04 | 0.61 |
| Leakage current with impression of 6 v. ($\mu$a.) | 0.32 | 4.36 |
| Electrostatic capacity 120 c./s. ($\mu$f.) | 1.18 | 1.02 |
| Tan $\delta$ at 120 c./s | 0.011 | 0.032 |

NOTE.—Numerical values in the above table indicate mean values of ten samples for respective condensers.

Since, in the above embodiment, the formation voltage of 60 volts is employed, a maximum voltage of 70 volts can be impressed on the anode during the electrolytic deposition of manganese dioxide. However, at a higher impression voltage, great current concentrates on the weak points in the oxide film, which will thereby be finally destroyed. Generally, a maximum applicable voltage is proportional to a formation voltage during anodic oxidation and concentration of sulfuric acid in an electrolytic bath. When, for example, concentration of sulfuric acid in the electrolytic bath is varied widely with the concentration of manganese sulfate kept at 1 mol/l., and manganese dioxide is electrolytically deposited on the surface of sintered titanium anodes having been subjected to anodic oxidation at different formation voltages of 40 volts, 50 volts and 60 volts, a maximum applicable voltage for each case is as shown in Table 2.

TABLE 2

| Formation voltage | 40 v. | 50 v. | 60 v. |
|---|---|---|---|
| Concentration of sulfuric acid: | Volts | Volts | Volts |
| 0.1 mol/l | 50 | 63 | 75 |
| 0.5 mol/l | 45 | 58 | 70 |
| 1.0 mol/l | 40 | 52 | 63 |
| 2.0 mol/l | 35 | 45 | 58 |

Leakage current in a finished solid type condenser will become smaller when voltage applied to an electrolytic bath is kept as high as possible during the electrolytic deposition of manganese dioxide. Table 3 shows a relation between bath voltage and characteristics of solid type condensers obtained as finished articles when sintered titanium anodes having been subjected to anodic oxidation at a formation voltage of 60 volts are treated in an electrolytic bath including a mixture of 1 mol/l. of manganese sulfate and 0.5 mol/l. of sulfuric acid for effecting electrolytic deposition of manganese dioxide.

TABLE 3

| | Characteristics of finished articles | | |
|---|---|---|---|
| Bath voltage | Leakage current under impression of 6 volts, $\mu$a. | Capacity, $\mu$f. | Tan $\delta$ |
| 70 volts | 0.28 | 1.10 | 0.035 |
| 50 volts | 0.35 | 1.19 | 0.012 |
| 35 volts | 0.90 | 1.21 | 0.015 |
| 20 volts | 1.86 | 1.25 | 0.024 |

Electrolytic deposition operation of too prolonged duration will result in deposition of a thick film of manganese dioxide not only on the weak points but also on the entire surface of titanium anodes, and characteristics of finished solid type condensers will be more or less degraded. In order to make a study about this matter, sintered titanium anodes having been subjected to anodic oxidation at a formation voltage of 60 volts as in the above case are subjected to electrolysis in an electrolytic bath of said composition heated to a temperature of 85° C. under a bath voltage of 60 volts for various duration of electrolysis, and then the anodes are treated in the same manner with that used in the embodiment shown to obtain solid type condensers. Table 4 shows a relation between the duration of electrolysis and characteristics of finished articles.

TABLE 4

| | Characteristics of finished articles | | |
|---|---|---|---|
| Duration of electrolysis | Leakage current under impression of 6 volts, $\mu$a. | Capacity, $\mu$f. | Tan $\delta$ |
| 1 min | 3.15 | 1.35 | 0.025 |
| 5 min | 1.28 | 1.24 | 0.018 |
| 10 min | 0.41 | 1.20 | 0.012 |
| 20 min | 0.38 | 1.15 | 0.025 |
| 30 min | 0.44 | 1.12 | 0.053 |

Although there may be various methods for depositing a great amount of manganese dioxide by means of pyrolysis of manganese nitrate after electrolytic deposition of manganese dioxide on the weak points in the anodic oxidation film, a simplest method has been described in the embodiment, which method comprises impregnation of a 60% manganese nitrate solution into the anode and heating the anode for 5 minutes in a furnace at a temperature of 300° C. Since, however, characteristics of finished articles are greatly affected by the condition of heating, such process is now under a careful investigation.

The following method is considered to be one of modifications of the method according to the invention. According to such modification, the step of forming the electrolytically deposited layer of manganese dioxide on the anodic oxidation film of titanium and the subsequent step of forming thereon the layer of manganese dioxide by the pyrolysis of manganese nitrate according to the embodiment shown are reversed in their order. In the modification, a layer of manganese dioxide is first formed on the anodic oxidation film of titanium by pyrolysis of manganese nitrate, and thereafter manganese dioxide is selectively filled in weak points in the film by electrolytic deposition. There may be another modification, in which the weak points in the anodic oxidation film of titanium are first filled with a layer of manganese dioxide deposited on the film by electrolysis, the film is then covered with a great amount of manganese dioxide obtained by pyrolysis of manganese nitrate, and finally electrolytic deposition of manganese dioxide is again made to fill the weak points in the anodic oxidation film which has been substantially damaged by the preceding pyrolytic treatment. Table 5 shows a relation between characteristics of finished articles and processes taken in the above-described embodiments of the invention.

TABLE 5

| Method of semiconductor deposition | Characteristics of finished articles | | |
|---|---|---|---|
| | Leakage current under impression of 6 volts, μa. | Capacity, μf. | Tan δ |
| 1. Electrolytic deposition →pyrolysis | 0.32 | 1.18 | 0.011 |
| 2. Pyrolysis→electrolytic deposition | 0.52 | 1.22 | 0.021 |
| 3. Electrolytic deposition →pyrolysis→electrolytic deposition | 0.07 | 1.13 | 0.025 |

It will be seen from Table 5 that the third method of semiconductor deposition is especially effective to lower the leakage current, with the slight sacrifice of the capacity and tan δ.

The above embodiment relates to an example in which the anodic oxidation of titanium is made in a molten salt. However, in the case of the anodic oxidation film of titanium obtained by the anodic oxidation in a non-aqueous electrolyte as described previously, close attention must be paid to the selection of various conditions in the process of electrolytic deposition of oxide semiconductor. Or more precisely, the impression voltage must be controlled so that the density of current passing through the electrode may be kept as low as possible. This is because passage of an excessive current through the oxide film may result in exfoliation of the film from metallic titanium. For example, a film obtained by the anodic oxidation of a titanium plate at a voltage of 60 volts in a glycol solution containing 10% of ammonium borate will exfoliate in the form of small fragments when a voltage of more than 200 volts is impressed thereon in the electrolyte described in the above embodiment of the invention. In view of the above respect, the method according to the invention may more easily be applicable to the electrode obtained by the anodic oxidation of titanium in the molten salt.

An anodic oxidation film of titanium obtained by prior processes has shown a greater leakage current attributable to a multiplicity of weak points when compared with an oxide film of such metal as aluminum or tantalum, and, especially in case of a sinter-bonded anode, it has been extremely difficult to obtain an oxide film of an excellent insulating property uniformly formed all over the surface of the sinter-bonded body. Due to such difficulty, improvement in characteristics of the solid type electrolytic condenser of titanium has not been easily attained and there has been an ever-increasing demand for new means of minimizing the leakage current. It will be apparent that the invention provides a novel method which is quite effective to improve the characteristics of the solid type electrolytic condenser of titanium.

What is claimed is:
1. A process of forming a solid electrolytic condenser of titanium comprising the following steps: anodizing the surface of a titanium pellet; forming a layer of manganese dioxide on the anodic oxidation surface by pyrolysis of manganese nitrate covering the entire anodized surface of the titanium with a semi-conductive oxide layer; and forming another layer of manganese dioxide at the weak points of the anodied surface by electrolytical deposition.

2. A process of forming a solid electrolytic condenser of titanium comprising the following steps: anodizing a titanium pellet; forming a semi-conductive oxide layer on said anodized surface by electrolytic deposition; forming another semi-conductive oxide layer thereon by pyrolytic decomposition; and applying semi-conductive oxide by electrolytic decomposition to weak points in the anodized surface damaged by the pyrolytic treatment of the semi-conductive oxide.

3. A process of forming a solid electrolytic condenser of titanium according to claim 2 wherein the electrolytic deposition of a semi-conductive oxide layer utilizes an electrolyte solution containing manganese sulfate and sulfuric acid and deposits manganese dioxide.

4. The process of forming a solid electrolytic condenser of titanium according to claim 2 wherein the step of forming a semi-conductive oxide layer by pyrolysis includes the conversion of a solution of manganese nitrate into manganese dioxide.

5. A method of forming a solid electrolytic condenser of titanium comprising the following steps: pressing a powdered titanium metal and sinter thereof into a porous pellet; anodizing the surface thereof using a fused salt of sodium nitrate; coating the anodized surface with two layers of manganese dioxide, forming one by electrolytic decomposition and the other by a pyrolytic conversion process.

6. A method of forming a solid electrolytic condenser of titanium as claimed in claim 5 wherein the step of anodizing the surface of a porous pellet of titanium includes the application of a voltage in the range 40 to 60 volts to said pellet in a fused salt of sodium nitrate.

7. A method of forming a solid electrolytic condenser of titanium as claimed in claim 5 wherein the step of coating the anodized surface with a layer of manganese dioxide by electrolytic deposition uses an electrolyte solution containing 1 mol./l. of manganese sulfate added with sulfuric acid in the range of 0.1 to 2.0 mol/l.

8. A method of forming a solid electrolytic condenser of titanium comprising the following steps: pressing a powdered titanium metal and sinter thereof into a porous pellet; anodizing the surface thereof using a fused salt of sodium nitrate; coating weak points of the anodized surface with manganese dioxide by electrolytic deposition; coating the outer side thereof with manganese dioxide by pyrolytic decomposition; and coating the weak points again with manganese dioxide by electrolytic deposition.

9. A method of forming a solid electrolytic condenser of titanium as claimed in claim 8, wherein the step of anodizing the surface of a porous pellet of titanium includes the application of a voltage in the range of 40 to 60 volts.

References Cited

UNITED STATES PATENTS

| 2,631,115 | 3/1953 | Fox | 136—138 |
| 2,822,606 | 2/1958 | Yoshida | 29—25.3 |
| 2,981,647 | 4/1961 | Schwartz | 148—6.14 |
| 2,989,447 | 6/1961 | Power | 204—42 |
| 3,100,329 | 8/1963 | Sherman | 29—25.31 |
| 3,225,417 | 12/1965 | Lagercrantz | 29—25.31 |

HOWARD S. WILLIAMS, *Primary Examiner.*

W. VAN SISE, *Assistant Examiner.*

JOHN H. MACK, *Examiner.*

UNITED STATES PATENT OFFICE

CERTIFICATE OF CORRECTION

Patent No. 3,359,191                                          December 19, 1967

Shinichi Minami et al.

It is hereby certified that error appears in the above numbered patent requiring correction and that the said Letters Patent should read as corrected below.

In the heading to the printed specification, line 10, for "Feb. 23, 1963" read -- Feb. 22, 1963 --.

Signed and sealed this 22nd day of April 1969.

(SEAL)
Attest:

Edward M. Fletcher, Jr.                                EDWARD J. BRENNER
Attesting Officer                                                Commissioner of Patents